United States Patent
Stratton et al.

(10) Patent No.: US 6,246,770 B1
(45) Date of Patent: Jun. 12, 2001

(54) METHOD AND APPARATUS FOR FEATURE CONFIGURATION IN REMOTELY LOCATED ULTRASOUND IMAGING SYSTEM

(75) Inventors: Gregory C. Stratton, Wauwatosa; Charles Cameron Brackett, Waukesha; Chandler A. Johnson, Oconomowoc, all of WI (US)

(73) Assignee: General Electric Company, Milwaukee, WI (US)

(*) Notice: Subject to any disclaimer, the term of this patent is extended or adjusted under 35 U.S.C. 154(b) by 0 days.

(21) Appl. No.: 09/065,171

(22) Filed: Apr. 23, 1998

(51) Int. Cl.[7] ................................................ H04L 9/08
(52) U.S. Cl. ...................... 380/281; 713/182; 713/183; 713/200
(58) Field of Search ..................... 600/411, 433; 380/278, 281; 713/164, 182, 183, 200

(56) References Cited

U.S. PATENT DOCUMENTS

| | | | |
|---|---|---|---|
| 5,008,936 | * | 4/1991 | Hamilton et al. ...................... 380/50 |
| 5,265,164 | * | 11/1993 | Matyas et al. ......................... 380/30 |
| 5,610,981 | * | 3/1997 | Mooney et al. ........................ 380/25 |
| 5,848,231 | * | 12/1998 | Teitelbaum et al. ................. 395/186 |
| 5,924,990 | * | 7/1999 | Nachtomy et al. .................. 600/443 |
| 6,016,439 | * | 1/2000 | Acker ................................... 600/411 |

* cited by examiner

Primary Examiner—Thomas R. Peeso
Assistant Examiner—Todd Jack
(74) Attorney, Agent, or Firm—Christian G. Cabou; Phyllis Y. Price; Dennis M. Flaherty (57) ABSTRACT

A method and apparatus for configuring an ultrasound imaging system at a remote location by obtaining an encrypted feature key from a central location (e.g., via telephone) and then inputting that feature key into the ultrasound imaging system using an operator interface (e.g., a keyboard). To validate the feature key, the ultrasound imaging system decrypts the encrypted data and then compares the decrypted data to validation data pre-stored in the system. If the decrypted data matches the validation data, then the optional feature identified by the feature key will be enabled each time the system is booted or initialized. Optionally, an expiration date can be associated with the activated option, after which date the feature will be disabled when the system is initialized. Similarly, an activated optional feature can be disabled at a remote location by the input of an encrypted key obtained from a central location.

18 Claims, 3 Drawing Sheets

METHOD AND APPARATUS FOR FEATURE CONFIGURATION IN REMOTELY LOCATED ULTRASOUND IMAGING SYSTEM

FIELD OF THE INVENTION

This invention generally relates to systems for ultrasound imaging of the human anatomy for the purpose of medical diagnosis. In particular, the invention relates to a method for configuring a remotely located ultrasound imaging system to add or delete features.

BACKGROUND OF THE INVENTION

Figure 1:
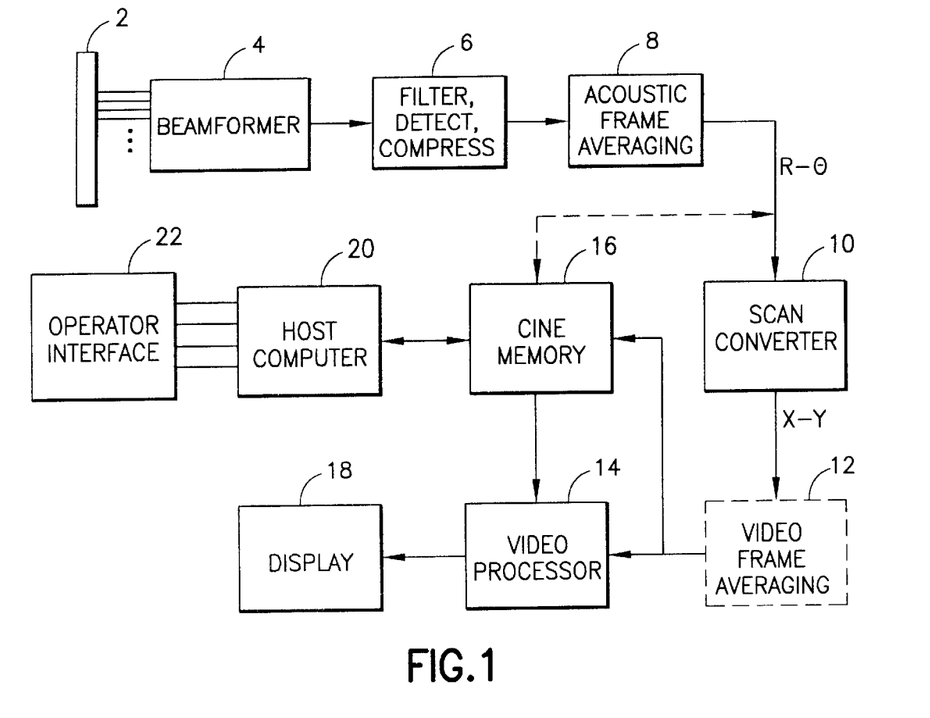
FIG. 1 is a block diagram showing the major functional subsystems within a conventional real-time ultrasound imaging system.

Conventional ultrasound scanners create two-dimensional B-mode images of tissue in which the brightness of a pixel is based on the intensity of the echo return. The basic signal processing chain in the conventional B mode is depicted in FIG. 1. An ultrasound transducer array 2 is activated to transmit an acoustic burst along a scan line. The return RF signals are detected by the transducer elements and then formed into a receive beam by the beamformer 4. The beamformer output data (I/Q or RF) for each scan line is passed through a B-mode processing chain 6 which includes demodulation, equalization filtering, envelope detection and logarithmic compression. Depending on the scan geometry, up to a few hundred vectors may be used to form a single acoustic image frame. To smooth the temporal transition from one acoustic frame to the next, some acoustic frame averaging 8 may be performed before scan conversion.

In general, the log-compressed display data is converted by the scan converter 10 into X-Y format for video display. On some systems, frame averaging may be performed on the X-Y data (indicated by dashed block 12) rather than the acoustic frames before scan conversion, and sometimes duplicate video frames may be inserted between acoustic frames in order to achieve a given video display frame rate. The scan-converted frames are passed to a video processor 14, which maps the video data to a gray-scale mapping for video display. The gray-scale image frames are then sent to a video monitor 18 for display.

System control is centered in a host computer 20, which accepts operator inputs through an operator interface 22 (e.g., a keyboard) and in turn controls the various sub-systems. (In FIG. 1, only the image data transfer paths are depicted.) During B-mode imaging, a long sequence of the most recent images are stored and continuously updated automatically in a cine memory 16. Some systems are designed to save the R-θ acoustic images (this data path is indicated by the dashed line in FIG. 1), while other systems store the X-Y video images. The image loop stored in cine memory 16 can be reviewed via track-ball control, and a section of the image loop can be selected for hard disk storage.

For an ultrasound imaging system which has been configured with a free-hand three-dimensional imaging capability, the selected image sequence stored in cine memory 16 is transferred to the host computer 20 for three-dimensional reconstruction. The result is written back into another portion of the cine memory, from where it is sent to the display system 18 via video processor 14.

From the standpoint of the vendor of the ultrasound imaging system, it is desirable to sell or lease systems having built-in optional features which can be activated at a location remote from a central billing station. For example, the capability of free-hand three-dimensional imaging can be an optional feature which must be purchased from the system vendor. To ensure that the system user is charged for the use of such optional features, it is known to provide means for blocking activation of optional features unless authorization is obtained from the manufacturer. Authorization can also be given to allow for use of an optional feature free of charge for a predetermined trial period. In one conventional ultrasound system, this is accomplished by delivery of an authorized feature activation disk, which is inserted into a slot in the system. The disk has validation information and feature information stored thereon. The system compares the validation information with a unique validation standard pre-stored in the system memory. If the validation data matches the unique pre-stored standard, the feature information stored on the disk is incorporated in the system configuration database. Thereafter and until the expiration date, whenever the system is initialized, optional feature or features represented by the feature information of the disk will be enabled.

However, there is a need for a method of configuring an ultrasound imaging system at a remote location without physically transferring an authorization disk or card from the central location to the remote location. In particular, there is a need for a method of system configuration which can be carried out remotely while avoiding the delays inherent in the shipment or delivery of a disk or card from a central location.

SUMMARY OF THE INVENTION

The present invention is a method and apparatus for configuring an ultrasound imaging system at a remote location by obtaining an encrypted feature key from a central location (e.g., via telephone) and then inputting that feature key into the ultrasound imaging system using an operator interface (e.g., a keyboard). To validate the feature key, the system decrypts the encrypted data and then compares the decrypted data to validation data pre-stored in the system. If the decrypted data matches the validation data, then the optional feature identified by the feature key will be enabled each time the system is booted or initialized. Optionally, an expiration date can be associated with the activated option, after which date the feature will be disabled when the system is initialized.

In accordance with the broad scope of the invention, an activated optional feature can be disabled at a remote location by the input of an encrypted key obtained from a central location. The term "feature key" shall be used hereinafter to mean any key for activating or deactivating an optional feature.

To enable an optional feature on the ultrasound system in accordance with the preferred embodiment of the invention, an authorized service representative or other user at the remote location opens a communication link with a central location. In order to obtain a feature key for enabling the feature, the user must identify the option desired and provide the machine identification number and the option expiration date to the central location. Service personnel at the central location then run a key maker application using the given data. The key maker application employs a value extractor to organize the inputted data into vectors, and an encryption engine to transform those vectors (by multiplying each vector with a non-singular matrix) into an encrypted feature key comprising a string of numeric characters. The encrypted feature key is then communicated to the user at the remote location.

To facilitate entry of the encrypted feature activation key into the system, first the user must enter a predetermined sequence of alphanumeric characters representing an enter key entry mode command. The characters can be entered, for example, by depressing keys located either on a front panel of the system or on a modular keyboard connected to the system. The enter key entry mode command places the machine in a suspended state (i.e., the feature key entry mode) in which the next data inputted into the system is processed as a feature key. The user then enters the string of numeric characters representing the encrypted feature key into the system.

The ultrasound imaging system at the remote location is programmed with an encryption engine identical to that used at the central location to generate the encrypted feature key. After reading the encrypted feature key (i.e., storing the inputted numeric characters in a buffer), the system extracts the values representing the key identifier, machine identification number, option and option expiration date. The extracted values are then organized into vectors, which vectors are input into the encryption engine. The encryption engine decrypts the encrypted feature key by linear transformation of the inputted vectors using the matrix which results when the non-singular matrix used during the encryption process is inverted. The decrypted vectors representing the key identifier and machine identification number are then validated. If the key identifier and machine identification number are both valid, then the decrypted option and expiration date vectors are input to an option activator, which copies the option and expiration date data into the options structure within the system configuration database. If the expiration date is valid, the feature identified by the installed option data will be activated each time that the system is booted, until the expiration date.

DETAILED DESCRIPTION OF THE PREFERRED EMBODIMENTS

Figure 2:
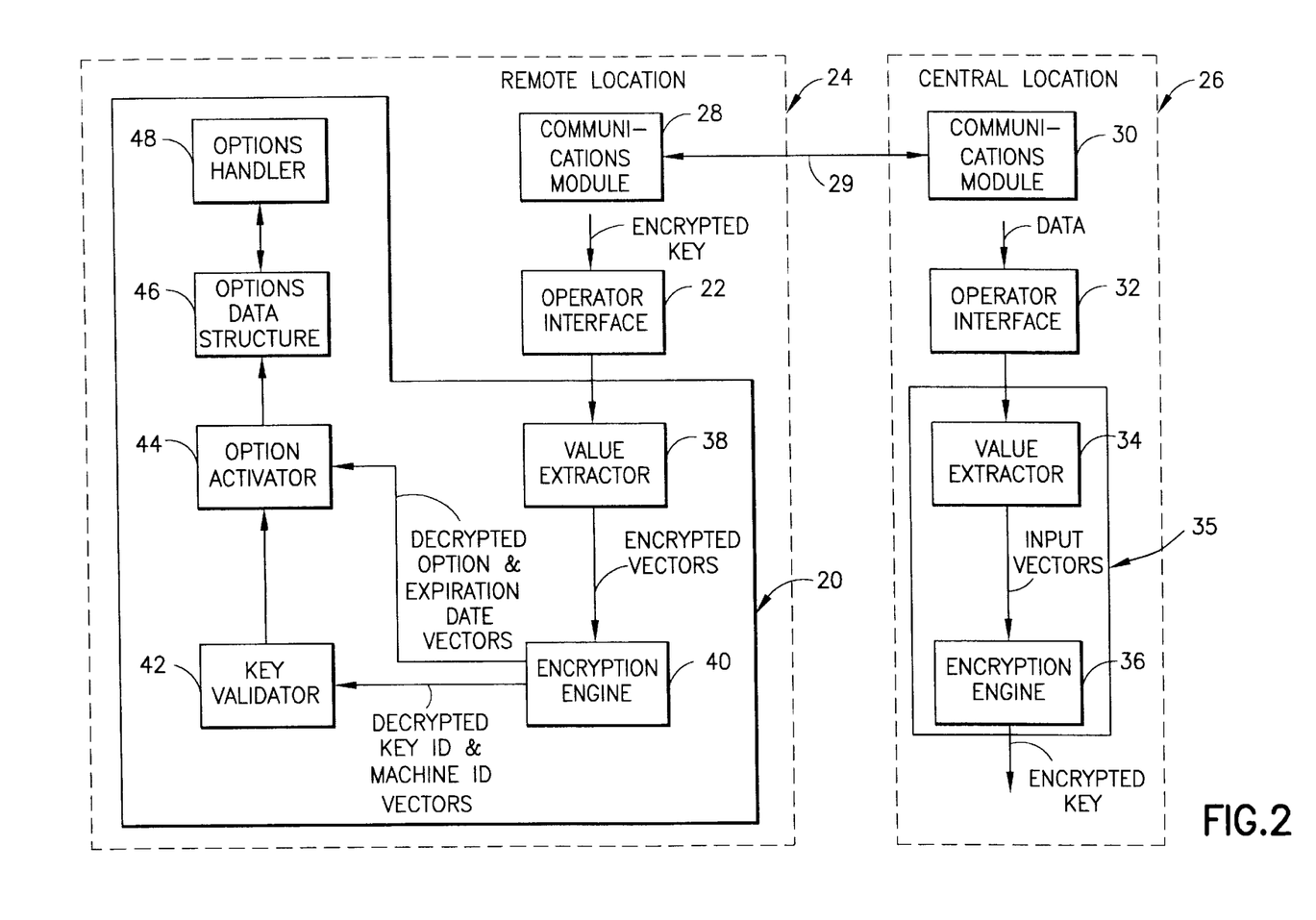
FIG. 2 is a block diagram showing a system for configuring an ultrasound imaging system at a remote location by obtaining an encrypted feature key from a central location via a communications link in accordance with one preferred embodiment of the invention.

FIG. 2 depicts the overall system for feature configuration of an ultrasound imaging system at a remote location 24 using an encrypted feature key transmitted from a central location 26. Although FIG. 2 shows only the host computer 20 and the operator interface 22 of the ultrasound imaging system, it will be appreciated that the ultrasound imaging system at remote location 24 may also incorporate the components depicted in FIG. 1 or components of a different type of ultrasound imaging system.

The remote location 24 is also provided with a communications module 28 which can be connected to a communications module 30 at the central location 26 by opening a communications link 29. For example, the communications link can be a telephone line. In accordance with the preferred embodiment of the invention, to enable an optional feature on the ultrasound imaging system, a user at the remote location 24 must obtain an encrypted feature key from the central location. To accomplish this, the user must first open communications link 29 and then transmit numeric data representing the option to be activated, the expiration date of that option and a machine identification number (i.e., serial number) which is unique to the system being configured.

After this information has been transmitted, service personnel at the central location input the transmitted data into an operator interface 32 which interfaces with a central computer 35. The data is input into the operator interface as a string of numeric characters. The output of operator interface 32 is input to a value extractor 34 which is incorporated in central computer 35. Initially, the string of numeric characters is stored in a buffer incorporated in the value extractor 34. The central computer also adds a key identifier to the string of numeric characters. The key identifier is a special code used to identify a valid feature key. Optionally, a limit can be placed on the duration of option activation as represented by the expiration date, e.g., the central computer may be programmed to reject any request for a feature activation key made more than 30 days prior to the expiration date. The value extractor 34 then organizes the string of numeric characters into a series of vectors in $R^x$ space, where x is the dimension of a non-singular matrix used in the encryption process.

The central computer 35 further comprises an encryption engine 36 which receives the series of vectors output by the value extractor 34. To encrypt these vectors, the encryption engine 36 utilizes a non-singular encryption matrix A. The matrix A is non-singular to allow for decryption using the inverted matrix $A^{-1}$. In accordance with the preferred embodiment of the invention, the non-singular encryption matrix is not prestored, but rather is generated by the central computer from pre-stored matrix precursor data. As a result, the encryption matrix cannot be simply addressed and read out of memory by persons having access to the central computer, thus providing an added measure of security.

After the encryption matrix A has been generated, each vector $V_i$ is encrypted by performing the linear transformation $L(V_i)=AV_i$. The resulting encrypted vectors form a string of numeric characters which constitute the encrypted feature key. The service personnel at the central location 26 then transmit the encrypted feature key to the remote location 24 via the communications link 29 or via a different communications link.

Upon receipt of the encrypted feature key, the user at the remote location places the ultrasound imaging system in a feature key entry mode and then inputs the encrypted feature key into the host computer 20 via the operator interface 22. The encrypted key is stored in a buffer incorporated in the value extractor 38. The value extractor 38 parses the string of numeric characters constituting the encrypted key into the respective values: key identifier, machine identification number, option and expiration date, and then organizes those values into respective encrypted vectors $X_i$. The encrypted vectors are then decrypted by an encryption engine 40 using matrix $A^{-1}$ i.e., the inverted non-singular encryption matrix. For added security, the host computer 20 constructs matrix $A^{-1}$ from pre-stored precursor data. Each encrypted vector $X_i$ is decrypted by performing the linear transformation $L(X_i)=A^{-1}X_i$. The decrypted key identifier and machine identification number are output to a key validator 42. If the key validator determines that both the key identifier and the machine identification number are valid, then the key validator generates a signal which enables the option activator 44. The option activator 44 receives the decrypted option and expiration date from the encryption engine 40 and copies that data into respective fields in options data structure 46, which forms part of the system configuration database. The ultrasound sound imaging system is then rebooted automatically. Upon rebooting, the options handler 48 configures the system in accordance with the new data stored in the options data structure 46. In particular, the options handler 48 enables the feature identified by the new options datum stored in the options field. That feature will be enabled each time the system is initialized until expiration of the option on the date indicated in the expiration date field of the options data structure.

Figure 3:
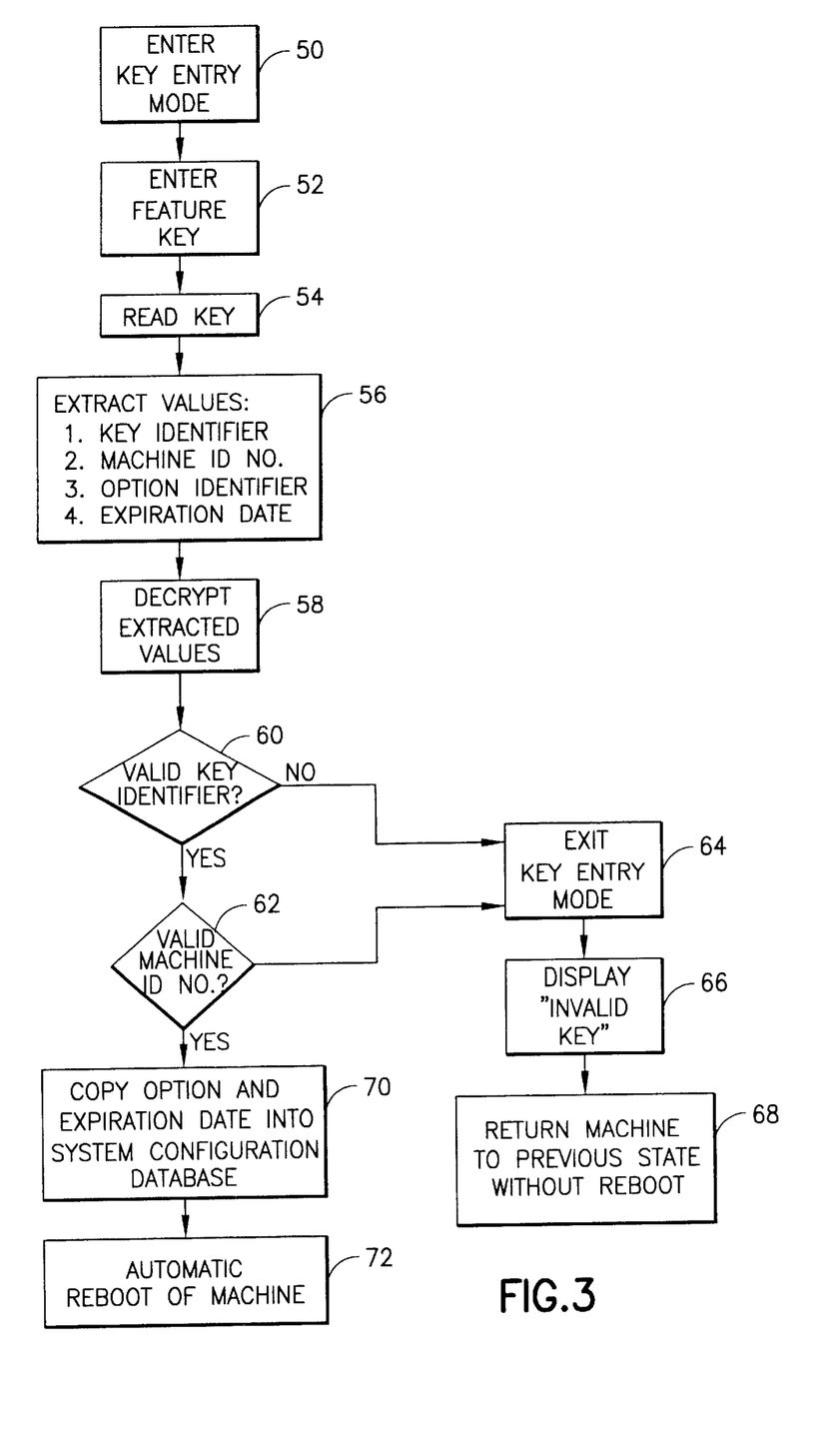
FIG. 3 is a flowchart showing the steps of a method for configuring an ultrasound imaging system in accordance with the preferred embodiment of the invention.

The method for configuring a remotely located ultrasound imaging system in accordance with the preferred embodiment of the invention is shown in more detail in FIG. 3. To facilitate entry of the encrypted feature key into the system, first the user must enter a predetermined sequence of alphanumeric characters representing an enter key entry mode command (step 50). The characters can be entered, for example, by depressing keys located either on a front panel of the system or on a modular keyboard connected to the system. A parameter routine interprets the predetermined sequence of alphanumeric characters (e.g., the sequence Δ+2) as the enter key entry mode command, placing the machine in a suspended state (i.e., the feature key entry mode). In the feature key entry mode, the next data inputted into the system will be processed as a feature key.

In the feature key entry mode, the user enters the string of numeric characters representing the encrypted feature key into the operator interface (step 52). Optionally, as the user types in the encrypted feature key, the system can respond to each key depression with a form of acknowledgement. The end of the string of numeric characters is indicated by depressing the "Enter" on the operator interface. The inputted encrypted key is then read (step 54) by storing the string of numeric characters in a buffer incorporated in the value extractor 38 (see FIG. 2). The "Read Key" function is enabled when the user types in the enter key entry mode command.

The value extractor parses or extracts the values (step 56) representing the key identifier, machine identification number, option and expiration date and then organizes those values into respective encrypted vectors. The encrypted vectors are then decrypted (step 58) using the inverted non-singular encryption matrix, as previously described. The decrypted key identifier data is then compared with a key identifier pre-stored in the system configuration database to determine whether the feature key is valid (step 60). If the feature key is valid, then the machine identification number, i.e., serial number, is compared with a machine identification number (also pre-stored in the system configuration database) which is unique to the system being configured (step 62). If the machine identification number is valid, then the decrypted option and expiration date are copied into respective fields in an options data structure in the system configuration database (step 70). The ultrasound imaging system is then rebooted automatically (step 72).

If either the key identifier or the machine identification number is invalid (steps 60 and 62 in FIG. 3), then the system exits the feature key entry mode (step 64). The message "Invalid Key" is displayed on the monitor (step 66). Then the system returns to its previous state without rebooting (step 68).

The foregoing preferred embodiments have been disclosed for the purpose of illustration. Variations and modifications of the basic concept of the invention will be readily apparent to persons skilled in the art. In particular, it will be appreciated that the encrypted feature key can be transmitted from the central location to a remote location via a communications link different than the link used to transmit data from the remote location to the central location. In addition, although the disclosed preferred embodiments employ encrypted numeric codes, it will be appreciated that the system can be readily adapted to operate using encrypted alphabetic or alphanumeric codes. All such variations and modifications are intended to be encompassed by the claims set forth hereinafter.

What is claimed is:

1. A method for configuring a system at a remote location, comprising the steps of:

storing a validation identifier inside said system;

transmitting an option identifier which identifies a change in system configuration and an expiration date associated with said change in system configuration from said remote location to a central location;

encrypting said validation identifier, said option identifier and said expiration date at said central location;

transmitting an encrypted feature key comprising a sequence of characters from said central location to said remote location, said encrypted feature key comprising said encrypted validation identifier, said encrypted option identifier and said encrypted expiration dates;

placing said system in a feature key entry mode;

inputting said encrypted feature key into said system by operation of a sequence of input keys corresponding to said sequence of characters of said encrypted feature key;

decrypting said encrypted feature key inside said system to form decrypted data comprising a decrypted validation identifier, a decrypted option identifier and a decrypted expiration date;

comparing said decrypted validation identifier with said stored validation identifier; and altering a system configuration database inside said system to reflect said change in system configuration only if said decrypted validation identifier matches said stored validation identifier, wherein said altering step further comprises storing said decrypted expiration date in said system configuration database.

2. A method for configuring a system at a remote location, comprising the steps of:

storing a validation identifier inside said system;

transmitting an option identifier which identifies a change in system configuration from said remote location to a central location;

constructing a non-singular encryption matrix at said central location;

encrypting said validation identifier and said option identifier at said central location, said encrypting step being carried out by applying said non-singular encryption matrix to said validation identifier and said option identifier;

transmitting an encrypted feature key comprising a sequence of characters from said central location to said remote location, said encrypted feature key comprising said encrypted validation identifier and said encrypted option identifier;

placing said system in a feature key entry mode;

inputting said encrypted feature key into said system by operation of a sequence of input keys corresponding to said sequence of characters of said encrypted feature key;

constructing a decryption matrix which is an inversion of said non-singular encryption matrix at said remote location;

decrypting said encrypted feature key inside said system to form decrypted data comprising a decrypted validation identifier and a decrypted option identifier, said decrypting step being carried out by applying said decryption matrix to vectors formed from said encrypted feature key;

comparing said decrypted validation identifier with said stored validation identifier; and altering a system configuration database inside said system to reflect said change in system configuration only if said decrypted validation identifier matches said stored validation identifier.

3. A method for configuring a system at a remote location, comprising the steps of:

storing a validation identifier inside said system;

transmitting an option identifier which identifies a change in system configuration from said remote location to a central location;

encrypting said validation identifier and said option identifier at said central location;

transmitting an encrypted feature key comprising a sequence of characters from said central location to said remote location, said encrypted feature key comprising said encrypted validation identifier and said encrypted option identifier;

placing said system in a feature key entry mode;

inputting said encrypted feature key into said system by operation of a sequence of input keys corresponding to said sequence of characters of said encrypted feature key;

decrypting said encrypted feature key inside said system to form decrypted data comprising a decrypted validation identifier and a decrypted option identifier;

comparing said decrypted validation identifier with said stored validation identifier; and altering a system configuration database inside said system to reflect said change in system configuration only if said decrypted validation identifier matches said stored validation identifier, wherein said validation identifier comprises a system identifier which uniquely identifies said system.

4. The method as defined in claim 1, wherein said change in system configuration is addition of an optional feature.

5. The method as defined in claim 1, wherein said change in system configuration is deletion of an optional feature.

6. The method as defined in claim 3, wherein said validation identifier further comprises a key identifyfier.

7. A method for configuring an ultrasound imaging system, comprising the steps of:

storing a validation identifier inside said system;

placing said system in a feature key entry mode;

inputting an encrypted feature key into said system by operation of a sequence of input keys corresponding to a sequence of characters, said encrypted feature key comprising an encrypted validation identifier, an encrypted option identifier and an encrypted expiration date;

decrypting said encrypted feature key inside said system to form decrypted data comprising a decrypted validation identifier, a decrypted option identifier and a decrypted expiration date;

comparing said decrypted validation identifier with said stored validation identifier; and altering a system configuration database inside said system to reflect a change in system configuration identified by said decrypted option identifier only if said decrypted validation identifier matches said stored validation identifier, said altering step further comprises storing said decrypted expiration date in said system configuration database.

8. A method for configuring a system, comprising the steps of:

storing a validation identifier inside said system;

placing said system in a feature key entry mode;

inputting an encrypted feature key into said system by operation of a sequence of input keys corresponding to a sequence of characters, said encrypted feature key comprising an encrypted validation identifier and an encrypted option identifier;

constructing a decryption matrix inside said system from decryption matrix precursor data;

decrypting said encrypted feature key inside said system to form decrypted data comprising a decrypted validation identifier and a decrypted option identifier, wherein said decrypting step is carried out by applying said decryption matrix to vectors formed from said encrypted feature key;

comparing said decrypted validation identifier with said stored validation identifier; and altering a system configuration database inside said system to reflect a change in system configuration identified by said decrypted option identifier only if said decrypted validation identifier matches said stored validation identifier.

9. A method for configuring a system, comprising the steps of:

storing a validation identifier inside said system;

placing said system in a feature key entry mode;

inputting an encrypted feature key into said system by operation of a sequence of input keys corresponding to a sequence of characters, said encrypted feature key comprising an encrypted validation identifier and an encrypted option identifier;

decrypting said encrypted feature key inside said system to form decrypted data comprising a decrypted validation identifier and a decrypted option identifier;

comparing said decrypted validation identifier with said stored validation identifier; and altering a system configuration database inside said system to reflect a change in system configuration identified by said decrypted option identifier only if said decrypted validation identifier matches said stored validation identifier, wherein said validation identifier comprises a system identifier which uniquely identifies said system.

10. The method as defined in claim 8, wherein said change in system configuration is addition of an optional feature.

11. The method as defined in claim 8, wherein said change in system configuration is deletion of an optional feature.

12. The method as defined in claim 9, wherein said validation identifier further comprises a key identifier.

13. An ultrasound imaging system comprising:

an ultrasound transmitter for transmitting ultrasound energy into a volume of ultrasound scatterers;

a signal processing chain for acquiring display data representing an image of ultrasound scatterers in said volume in accordance with a system configuration comprising enabled features, said display data being based on ultrasound energy scattered by said ultrasound scatterers;

a monitor for displaying said image in response to receipt of said display data;

a memory for storing a system configuration database representing said enabled features of said system configuration;

an operator interface comprising a plurality of keys for inputting data into said system;

means for placing said system in a feature key entry mode in response to a predetermined command input via said operator interface;

decrypting means for outputting decrypted data in response to depression of a sequence of keys of said operator representing an encrypted feature key comprising an encrypted validation identifier and an encrypted option identifier an encrypted expiration date, said decrypted data comprising a decrypted validation identifier, a decrypted option identifier and a decrypted expiration date;

validating means for determining if said decrypted validation identifier is valid; and means for altering said system configuration as a function of said decrypted option identifier only if said decrypted validation identifier is valid, wherein said altering means further comprises means for storing said decrypted expiration date in said system configuration database.

14. An ultrasound imaging system comprising:

an ultrasound transmitter for transmitting ultra-sound energy into a volume of ultrasound scatterers;

a signal processing chain for acquiring display data representing an image of ultrasound scatterers in said volume in accordance with a system configuration comprising enabled features, said display data being based on ultrasound energy scattered by said ultrasound scatterers;

a monitor for displaying said image in response to receipt of said display data;

a memory for storing a system configuration data-base representing said enabled features of said system configuration;

an operator interface comprising a plurality of keys for inputting data into said system;

means for placing said system in a feature key entry mode in response to a predetermined command input via said operator interface;

decrypting means for outputting decrypted data in response to depression of a sequence of keys of said operator representing an encrypted feature key comprising an encrypted validation identifier and an encrypted option identifier, said decrypted data comprising a decrypted validation identifier and a decrypted option identifier;

validating means for determining if said decrypted validation identifier is valid; and means for altering said system configuration as a function of said decrypted option identifier only if said decrypted validation identifier is valid, wherein said validation identifier comprises a system identifier which uniquely identifies said ultrasound imaging system.

15. The system as defined in claim 14, wherein said validation identifier further comprises a key identifier.

16. The system as defined in claim 15, wherein said change in system configuration is addition of an optional feature.

17. The system as defined in claim 15, wherein said change in system configuration is deletion of an optional feature.

18. The system as defined in claim 15, further comprising means for storing decryption matrix precursor data and means for constructing a decryption matrix based on said decryption matrix precursor data, wherein said decrypting means perform decryption by applying said decryption matrix to vectors formed from said encrypted feature key.

* * * * *

UNITED STATES PATENT AND TRADEMARK OFFICE
CERTIFICATE OF CORRECTION

PATENT NO.   : 6,246,770 B1
DATED        : June 12, 2001
INVENTOR(S)  : Gregory C. Stratton, Charles Cameron Brackett and Chandler A. Johnson It is certified that error appears in the above-identified patent and that said Letters Patent is hereby corrected as shown below:

Column 6, claim 1,
Line 24, replace the word "dates" with -- date --.

Column 7, claim 6,
Line 53, replace the word "identifyfier" with -- identifier --.

Change each of claims 4 and 5 to depend on claim 3 instead of on claim 1.

Change each of claims 10 and 11 to depend on claim 9 instead of on claim 8.

Change each of claims 16, 17 and 18 to depend on claim 14 instead of on claim 15.

Signed and Sealed this

Twenty-second Day of January, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,246,770 B1  
DATED : June 12, 2001  
INVENTOR(S) : Gregory C. Stratton, Charles Cameron Brackett and Chandler A. Johnson It is certified that error appears in the above-identified patent and that said Letters Patent is hereby corrected as shown below:

Column 6, claim 1,
Line 24, replace the word "dates" with -- date --.

Column 7, claim 6,
Line 53, replace the word "identifyfier" with -- identifier --.

Change each of claims 4 and 5 to depend on claim 3 instead of on claim 1.
Change each of claims 10 and 11 to depend on claim 9 instead of on claim 8.
Change each of claims 16, 17 and 18 to depend on claim 14 instead of on claim 15.

Signed and Sealed this

Twelfth Day of February, 2002

Attest:

JAMES E. ROGAN  
*Attesting Officer*     *Director of the United States Patent and Trademark Office*